US009515865B2

(12) United States Patent
Przybysz et al.

(10) Patent No.: US 9,515,865 B2
(45) Date of Patent: Dec. 6, 2016

(54) HANDLING USER IDENTITIES IN THE IP MULTIMEDIA SUBSYSTEM

(75) Inventors: Hubert Przybysz, Hägersten (SE); Timo Forsman, Älvsjö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1712 days.

(21) Appl. No.: 12/596,748

(22) PCT Filed: Apr. 20, 2007

(86) PCT No.: PCT/EP2007/053904
§ 371 (c)(1),
(2), (4) Date: Feb. 24, 2010

(87) PCT Pub. No.: WO2008/128570
PCT Pub. Date: Oct. 30, 2008

(65) Prior Publication Data
US 2010/0217858 A1  Aug. 26, 2010

(51) Int. Cl.
G06F 15/16 (2006.01)
H04L 29/12 (2006.01)
H04L 29/08 (2006.01)
H04L 29/06 (2006.01)

(52) U.S. Cl.
CPC ..... *H04L 29/12188* (2013.01); *H04L 61/1588* (2013.01); *H04L 65/1063* (2013.01); *H04L 67/16* (2013.01); *H04L 29/12047* (2013.01); *H04L 61/15* (2013.01); *H04L 65/1016* (2013.01); *H04L 65/1069* (2013.01); *H04L 65/1096* (2013.01)

(58) Field of Classification Search
USPC ....... 709/224, 217, 218, 227, 228, 229, 231, 709/238, 245; 455/412.2, 414.1, 416–417, 455/424, 426.1, 428, 432.1, 435.1, 456.5, 455/432.3, 445, 461; 370/352–356; 379/211.02
See application file for complete search history.

(56) References Cited

U.S. PATENT DOCUMENTS 6,731,932 B1 * 5/2004 Rune et al. ................ 455/432.1
7,561,041 B2 * 7/2009 Nguyen et al. ............. 340/540
(Continued)

OTHER PUBLICATIONS

Cablelabs, "Routing of SIP URI "user=phone" when domain doesn't own target user", Feb. 2007, 3GPP TSGCT WG1, C 1-070551, 24.229CR 1617, www.3gpp.org/ftp/tsg_ct/WG1_mm-cc-sm_ex-CN1/TSGC1_45/Docs/C1-070551.zip.*
(Continued)

*Primary Examiner* — Ruolei Zong
(74) *Attorney, Agent, or Firm* — Roger S. Burleigh

(57) ABSTRACT

A method of handling SIP requests received by an IP Multimedia Subsystem network. The method comprises determining whether or not the SIP destination identity is within a range of identities owned by an operator of the network but is currently unallocated to a subscriber or service of the network and, if yes, routing the message to one or more SIP application servers within the network and implementing service logic at the application server(s) specific to a network owned but unallocated SIP identity.

17 Claims, 6 Drawing Sheets

(56) References Cited

U.S. PATENT DOCUMENTS

| | | | |
|---|---|---|---|
| 7,796,578 B2* | 9/2010 | Stafford | 370/351 |
| 7,801,116 B2* | 9/2010 | Westman | 370/352 |
| 7,853,261 B1* | 12/2010 | Lewis et al. | 455/445 |
| 7,881,748 B2* | 2/2011 | Bari et al. | 455/553.1 |
| 8,055,270 B1* | 11/2011 | Copeland et al. | 455/456.1 |
| 2002/0160776 A1* | 10/2002 | Torabi | 455/435 |
| 2004/0184452 A1* | 9/2004 | Huotari et al. | 370/384 |
| 2004/0205241 A1* | 10/2004 | Aarnos et al. | 709/245 |
| 2006/0212511 A1* | 9/2006 | Garcia-Martin | 709/203 |
| 2008/0247384 A1* | 10/2008 | Arauz-Rosado et al. | 370/352 |

OTHER PUBLICATIONS

Cablelabs: "Routing of SIP URI "user=phone" when domain doesn't own target user"; 3GPP TSGCT WG1, C1-070551, 24.229CR 1617, [Online]; Feb. 5, 2007-Feb. 9, 2007; pp. 1-10; XP002470286; Vancouver, Canada; Retrieved from the Internet: URL: http://www.3gpp.org/ftp/tsg_CT/WGLmm-. cc-sm_ex-CNI!TSGCL45/Docs/CI-070551. zip>.

"Digital cellular telecommunications system (Phase 2+); Universal Mobile Telecommunications System (UMTS); IP Multimedia Subsystem (IMS); Stage 2 (3GPP TS 23.228 version 7.7.0 Release 7); ETSI TS 123 228" ETSI Standards, Lis, Sophia Antipolis Cedex, France, Bd. 3-SA2, Nr. V7.7.0, 1. Mar. 1, 2007, XP014037758.

* cited by examiner

HANDLING USER IDENTITIES IN THE IP MULTIMEDIA SUBSYSTEM

TECHNICAL FIELD

The present invention relates to the handling of user identities in the IP Multimedia Subsystem. More particularly, the invention relates to the handling of user and/or service identities which are unallocated by an IP Multimedia Subsystem network operator.

BACKGROUND

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

The UMTS (Universal Mobile Telecommunications System) is a third generation wireless system designed to provide higher data rates and enhanced services to subscribers. UMTS is a successor to the Global System for Mobile Communications (GSM), and includes the General Packet Radio Service (GPRS). GPRS introduces packet switching into the core network and allows direct access to Packet Data Networks (PDNs). UMTS is standardised by the $3^{rd}$ Generation Partnership Project (3GPP) which is a conglomeration of regional standards bodies such as the European Telecommunication Standards Institute (ETSI), the Association of Radio Industry Businesses (ARIB) and others. See 3GPP TS 23.002 for more details.

The 3GPP organisation has specified a subsystem known as the IP Multimedia Subsystem (IMS) for supporting traditional telephony as well as new IP multimedia services (3GPP TS 22.228, TS 23.228, TS 24.229, TS 29.228, TS 29.229, TS 29.328 and TS 29.329 Releases 5 to 7), with particular applicability to UMTS networks. IMS provides key features to enrich the end-user person-to-person communication experience through the use of standardised IMS Service Enablers, which facilitate new rich person-to-person (client-to-client) communication services as well as person-to-content (client-to-server) services over IP-based networks.

The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

FIG. 1 of the accompanying drawings illustrates schematically how the IMS fits into the mobile network architecture in the case of a GPRS/PS access network (IMS can of course operate over other access networks). Call/Session Control Functions (CSCFs) operate as SIP proxies within the IMS. The IMS architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the address at which a SIP user identity can be reached. In IMS, when a SIP terminal performs a registration, the IMS authenticates the user, and allocates an S-CSCF to that user from the set of available S-CSCFs. Whilst the criteria for allocating S-CSCFs is not specified by IMS, these may include load sharing and service requirements. It is noted that the allocation of an S-CSCF is key to controlling (and charging for) user access to IMS-based services. Operators may provide a mechanism for preventing direct user-to-user SIP sessions which would otherwise bypass the IMS.

During the registration process, it is the responsibility of the I-CSCF to select an S-CSCF if an S-CSCF is not already selected. The I-CSCF receives the required S-CSCF capabilities from the home network's Home Subscriber Server (HSS), and selects an appropriate S-CSCF based on the received capabilities. [It is noted that S-CSCF allocation is also carried out for a user by the I-CSCF in the case where the user is called by another party, and the user is not currently allocated an S-CSCF.] When a registered user subsequently sends a session request to the IMS, the P-CSCF is able to forward the request to the selected S-CSCF based on information received from the S-CSCF during the registration process.

Within the IMS service network, Application Servers (ASs) are provided for implementing IMS service functionality. Application Servers provide services to end-users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment. Different IFCs may be applied to different call cases. The IFCs are received by the S-CSCF from an HSS during the IMS registration procedure as part of a user's User Profile. Certain Application Servers will perform actions dependent upon subscriber identities (either the called or calling subscriber, whichever is "owned" by the network controlling the Application Server). For example, in the case of call forwarding, the appropriate (terminating) Application Server will determine the new terminating party to which a call to a given subscriber will be forwarded. In the case that an IFC indicates that a SIP message received at the S-CSCF should be forwarded to a particular SIP AS, that AS is added into the message path. Once the SIP message is returned by the AS to the S-CSCF, it is forwarded on towards its final destination, or forwarded to another AS if this is indicated in the IFCs.

Addressing in the IMS is handled using public user identities (SIP addresses) that are allocated to users by an IMS network operator. A given user may be allocated one or more public user identities. An operator owning the domain "ims-operator.com" will allocate public user identities such as "sip:john.smith@ims-operator.com", where the user portion of the SIP URI is used to differentiate between users while the domain points to the IMS operator's network.

Typically, an IMS operator will also be assigned ranges of E.164 numbers for allocation to its subscribers. For example, an IMS operator may be assigned the number range "+4685520XXXX", out of which it allocates telephone numbers for its users. These numbers can also provide additional IMS public user identities for users, taking the form, for example, "tel:+46855201234" for a tel URI, and "sip:+46855201234@ims-operator.com" for a SIP URI.

SUMMARY

A problem arises when the IMS operator receives a SIP request addressed to an identity that is within the scope and range of the identities belonging to the operator, but which has not been allocated to an actual user. Today's IMS will reject such a request back to the sender with a response of "404 Not Found". Such simple handling of the request prevents the IMS operator from executing a more intelligent service logic, e.g. to forward the request to another operator or a subsidiary where the addressed user does exist (e.g. in the GSTN), to provide a search service that helps the originator of the request to correct the target address on-line and then progress the request to the correct address, or to provide an announcement.

It is noted that this problem has in the past gone unrecognised due to the fact that the early IMS proposals concentrated on the use of SIP URIs rather than Tel URIs. With SIP URIs, it was thought that as these would follow a naming pattern, the "404 Not Found" response was sufficient. However, the introduction of Tel URIs and number-based SIP URIs means that out of range but within scope addresses will be a real problem within the IMS.

According to a first aspect of the present invention there is provided a method of handling SIP requests received by an IP Multimedia Subsystem network. The method comprises determining whether or not the SIP destination identity is within a range of identities owned by an operator of the network but is currently unallocated to a subscriber or service of the network and, if yes, routing the message to one or more SIP application servers within the network and implementing service logic at the application server(s) specific to a network owned but unallocated SIP identity.

Embodiments of the invention allow SIP requests destined for unallocated addressed to be handled in a much more flexible manner than is possible with, for example, the 404 Not Found based response. In particular, such requests can be directed to, and handled by, application servers having appropriate service logic.

The determination as to whether or not a SIP destination identity is unallocated can be done directly at a SIP proxy such as an I-CSCF or S-CSCF, or can be delegated by such a proxy to an HSS or SLF entity.

A preferred embodiment of the invention involves an I-CSCF receiving a request, and performing said determination by contacting an HSS and/or SLF. In the event that the SIP destination identity is unallocated, the I-CSCF forwards the request to an S-CSCF. The I-CSCF may include in the request an indication that the destination address is unallocated. If not, the S-CSCF may perform a query with the HSS/SLF.

An S-CSCF may be preconfigured with Initial Filter Criteria for an unallocated identity which is owned by the network operator, the Initial Filter Criteria specifying at least one application server. Alternatively, the S-CSCF may download Initial Filter Criteria for an unallocated identity which is owned by the network operator from a Home Subscriber Server upon receipt of a request at the S-CSCF, the Initial Filter Criteria specifying at least one application server.

In the case where the determination is performed by an I-CSCF, the I-CSCF may be preconfigured with an identity of an application server, and the method comprises invoking that application server at the I-CSCF for the received request if it is determined that the SIP destination identity is within a range of identities owned by an operator of the network and is currently unallocated to a subscriber or service of the network. The term "invoking" indicates that the request is forwarded to application server, i.e. the application server is "linked into" the SIP path.

According to a second aspect of the present invention there is provided an IP Multimedia Subsystem node comprising means for receiving a SIP request, means for determining whether or not the SIP destination identity of the request is within a range of identities owned by an operator of the network but is currently unallocated to a subscriber or service of the network and, if yes, for routing the message to one or more SIP application servers within the network or to another network node. The node may be an I-CSCF or an I-CSCF.

According to a third aspect of the present invention there is provided an IP Multimedia Subsystem Application Server comprising means for implementing service logic in respect of a SIP having a request SIP destination identity that is within a range of identities owned by an operator of the network but is currently unallocated to a subscriber or service of the network.

According to a fourth aspect of the present invention there is provided Home Subscriber Server for use in an IP Multimedia Subsystem and comprising means for receiving a query from an IP Multimedia Subsystem node containing a SIP destination identity, means for determining whether or not the SIP destination identity that is within a range of identities owned by an operator of the network but is currently unallocated to a subscriber or service of the network, and means for signalling the result of the determination back to said node.

According to a fifth aspect of the present invention there is provided a Subscriber Location Function for use in an IP Multimedia Subsystem and comprising means for receiving a query from an IP Multimedia Subsystem node containing a SIP destination identity, means for determining whether the SIP destination identity that is within a range of identities owned by an operator of the network but is currently unallocated to a subscriber or service of the network, means for identifying a Home Subscriber Server responsible for handling such identities, and means for identifying that Home Subscriber Server to said node.

DETAILED DESCRIPTION

Figure 1:
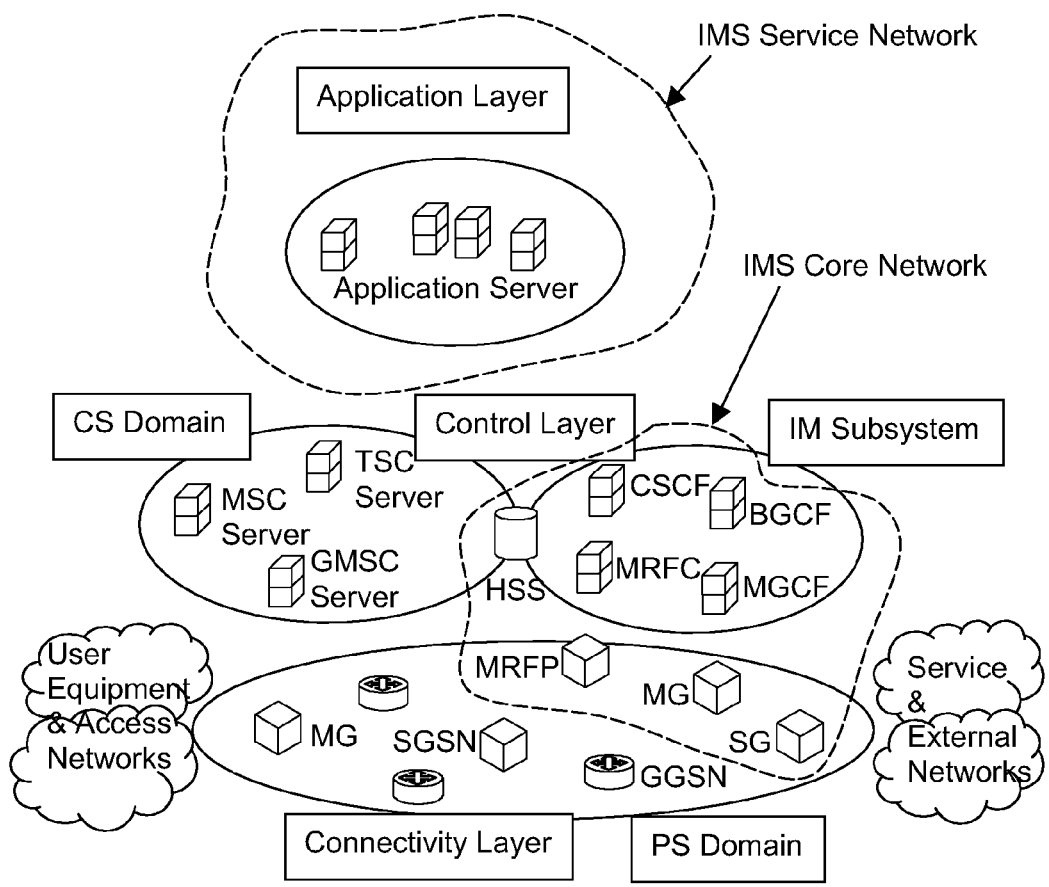
FIG. 1 illustrates schematically the integration of an IP Multimedia Subsystem into a 3G mobile communications system.

It is proposed here to introduce into the IMS a mechanism for handling an unallocated user identity which provides significant flexibility that is not provided by the prior art mechanisms. The new mechanism involves the following key functions:

1. Unallocated Identity Determination (UID)—new information about the scope and range of public user identities and telephone numbers owned by the operator will be introduced into the IMS system, so that the IMS system will be able to determine/recognise that a particular user identity belongs to the operator's scope/range and that the identity is currently unallocated.

The UID function is used first to check if the identity to which the SIP request is addressed is unallocated, i.e. that the identity is owned by the operator but is currently unallocated to an actual user or service. The actual data and logic to check if the identity belongs to the operator is dependent on how the operator creates the identities. In the typical case, it could be a simple check against a set of operator owned domains and number series. In a more complicated case, the data could be a (set of) regular expression which, when matched, would indicate that the identity is within the scope of the operator owned identities.

If the identity is unallocated, the processing of the request will continue in the service invocation function described below. Otherwise, when the identity is not unallocated (i.e. the identity is unknown by this operator or it is owned by the operator and allocated to an actual user or service) the processing of the request will continue according to the current IMS procedures (i.e. the request will be rejected or serviced respectively). Note that this function may also need to take into account that the identity may have been owned by the operator but is now "ported" to another operator. Porting of identities between operators is currently a regulatory service applicable for E.164 telephone numbers.

2. Service Invocation Mechanism for Unallocated User Identities (SIUI)—a new mechanism in the IMS system that allows the operator to control if and which Application Server or Application Servers will be invoked by the IMS system upon traffic requests addressed to a currently unallocated identity.

The SIUI function is used to check if there is a service or services to be executed for the unallocated identity. If there is, the function returns addresses of one or more Application Servers where the service logic is located. The function forwards the SIP request to the Application Server or Servers in priority order. In the case where there is no service for the unallocated identity provisioned in this network, the processing of the request will continue as if the identity was unknown by the operator, i.e. according to the current IMS procedures. Here the term "Application Server" is used broadly to refer to an IMS node that is able to handle the SIP request to an unallocated identity. In IMS terms, besides the AS as defined in TS 23.002, such an IMS node could also be an MRF, BGCF, MGCF, IBCF etc.

3. Service Logic for Unallocated User Identities (SEUI)—specific service logic executed in the Application Server or Application Servers for an unallocated identity. For example, the specific service logic could forward the request to another operator or a subsidiary where the addressed user does exist (e.g. in the GSTN), or to provide a search service that helps the originator of the request to correct the target address on-line and then progress the request to the correct address, or provide an announcement, etc. Other services are of course also possible.

Figure 2:
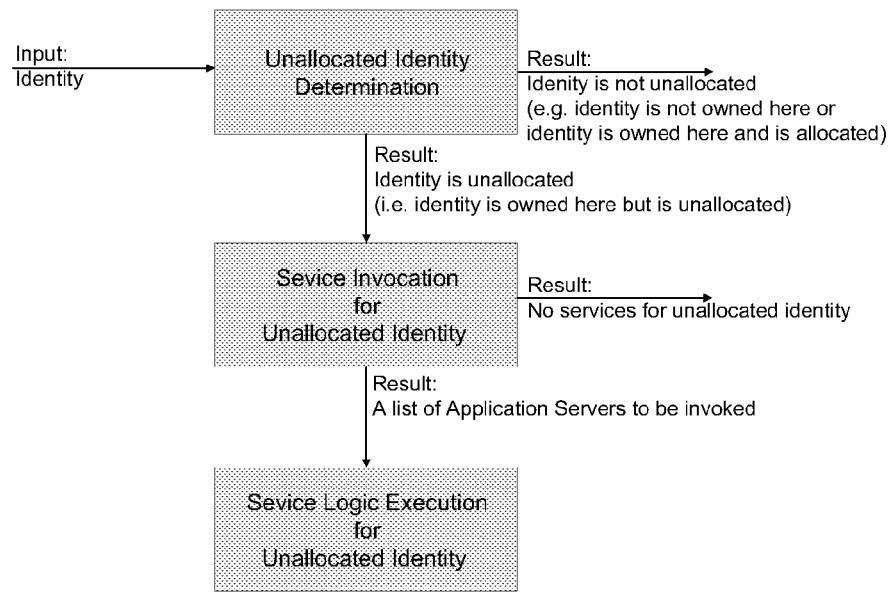
FIG. 2 presents an overview of a mechanism for handling unallocated addresses within the IMS.

FIG. 2 illustrates this mechanism schematically.

First Embodiment of the Invention

Figure 3:
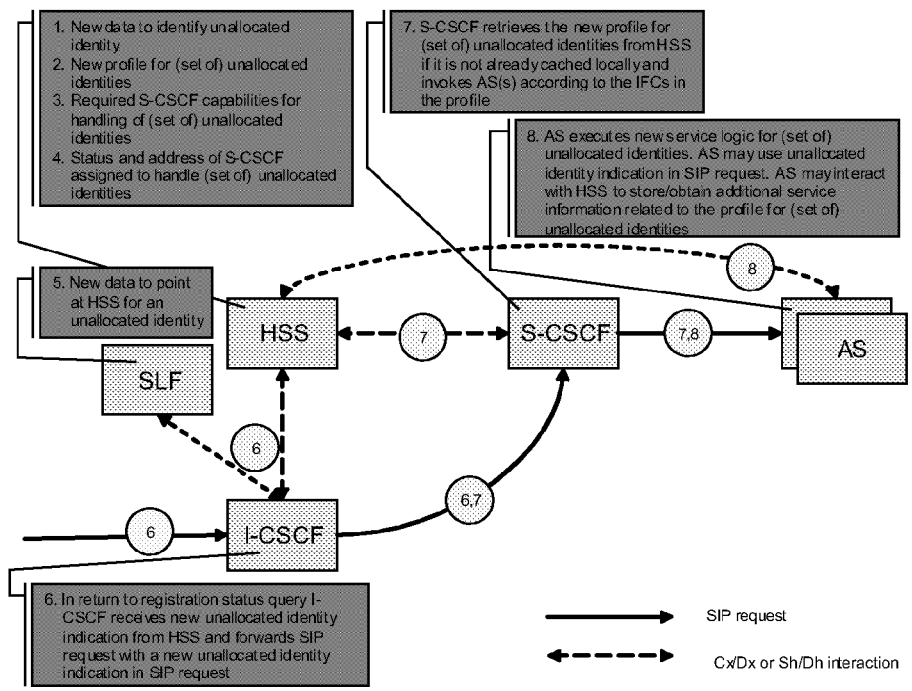
FIG. 3 illustrates schematically a first embodiment of a mechanism for handling unallocated addresses within the IMS and which performs AS invocation at a S-CSCF.

FIG. 3 illustrates schematically a first embodiment of the present invention which operates as follows:

1. The HSS node will become aware of the scope of identities (including telephone numbers) owned by the IMS network operator and will be able to determine that an identity belongs to the operator but is unallocated. When queried about such an identity over the Cx or Sh interfaces, the HSS will return new information to the enquiring node that indicates that the number is unallocated.

2. The HSS will have a new type of profile for unallocated identities. This new profile will be used to provision and store information required for common handling of unallocated user identities. The HSS may have one or more such profiles to handle different sets of unallocated identities. This new profile type will contain Initial Filter Criteria for use by an S-CSCF for service invocation, and may contain all the information normally contained in the user profile. The new profile type may also be able to indicate that there are no services for (a set of) unallocated identities.

3. As is the case for an allocated identity in today's IMS, the HSS will be able to store and provide required S-CSCF capabilities in the case of an unallocated identity to assist an I-CSCF in the process of selecting the S-CSCF when there is no S-CSCF currently allocated. The HSS will also be able to indicate when there is no service for the unallocated identity.

4. As is the case for an allocated identity in today's IMS, the HSS will be able to store and provide the address of the S-CSCF assigned to handle the (set of) unallocated identities to which an unallocated identity belongs.

5. As is the case for an allocated identity in today's IMS, the Subscriber Location Function (SLF) will be able to determine which HSS node or nodes are capable of handling an unallocated user identity and will return the correct HSS address when queried about an unallocated identity over Dx and Dh interfaces.

6. Upon receipt of a terminating SIP request, the I-CSCF will query the HSS (possibly after first querying the SLF and obtaining the address of the HSS to query) about the location information of the identity received in the Request-URI and will obtain a new indication that the identity is unallocated and, if there are services for the identity, the address of the S-CSCF if one is assigned or S-CSCF capabilities if an S-CSCF is not assigned. This new indication may be in the form of a reference to the new profile in the HSS. The I-CSCF will select an S-CSCF based on the received capabilities if one is not assigned. Otherwise it will use the address of the assigned S-CSCF as received from the HSS. The unallocated user identity will have user unregistered status. The I-CSCF will forward the SIP request to the S-CSCF and will include in the request an indication that the identity is unallocated. The I-CSCF will reject the SIP request if it receives from the HSS an indication that there is no service for the unallocated identity.

7. Upon receipt of a terminating SIP request, the S-CSCF may know by means of the new indication inserted by the I-CSCF that the request is addressed to an unallocated user identity. The S-CSCF may contact the HSS to download from the HSS the new profile for the (set of) unallocated users if the relevant profile is not already cached in the S-CSCF. The S-CSCF may also store its address in the HSS as the one serving the (set of) unallocated identities. The S-CSCF will then as per current procedures execute IFC evaluation procedure and will invoke Application Server(s) according to the provisioned IFCs. When forwarding the SIP request to an AS, the S-CSCF may also forward an indication that the identity is unallocated to facilitate recognition of the fact at the Application Server.

8. An AS receiving a terminating SIP request may use the indication in the request to determine that the request is addressed to an unallocated identity. The AS executes service logic for the (set of) unallocated identities. The AS may interact with the HSS over the Sh interface to store and obtain additional service information relevant for service execution related to the new profile.

Figure 4A:
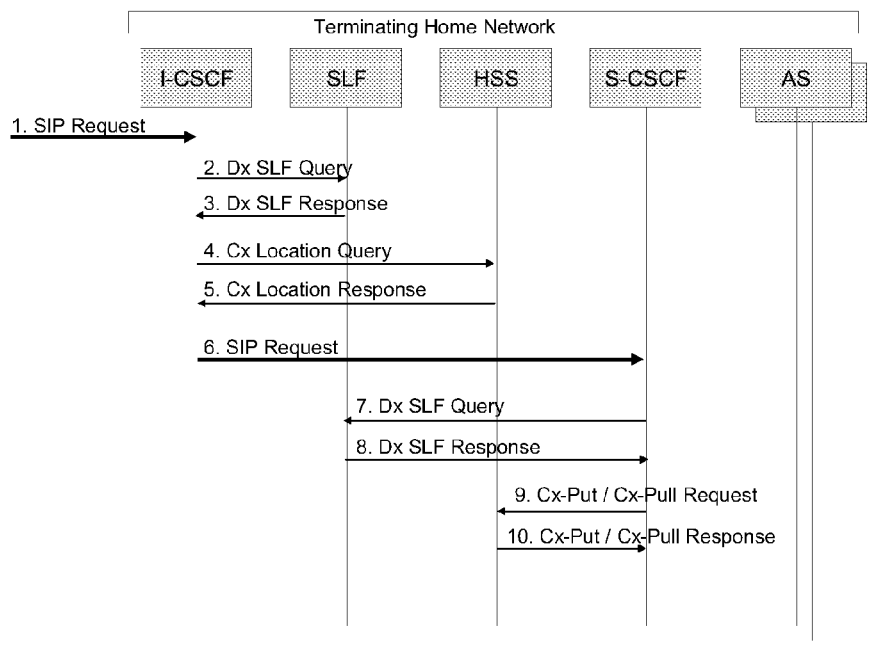
FIGS. 4*a* and 4*b* present a signalling flow for the embodiment of FIG. 3.
Figure 4B:
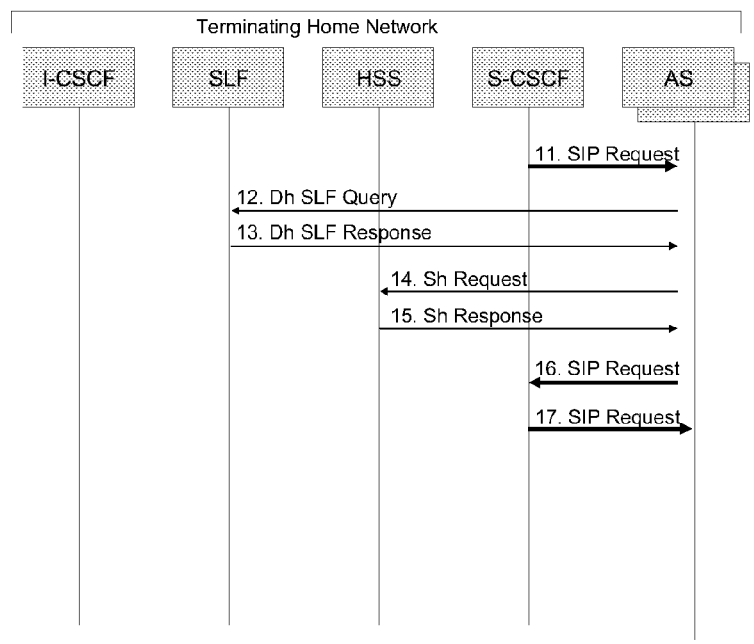

FIGS. 4a and 4b shows an example information flow for this embodiment within the IMS. The numbered steps shown in the Figure are as follows:

1. I-CSCF receives a terminating SIP request (which can be any request other than a SIP REGISTER request) addressed to an identity. In environments with multiple HSS nodes, the I-CSCF must find out the address of the HSS handling the identity and sends an SLF Query with the received identity over the Dx interface to the SLF as in step 2 below. Otherwise the I-CSCF sends a Cx Location Query with the received identity directly to the HSS and the sequence continues at step 4.

2. SLF receives the SLF Query over the Dx interface with the identity. In the case being analysed here the identity belongs to the operator but is not allocated to any user. Therefore new handling is needed in the SLF. The SLF will now also have the ability to point to an HSS node also for an unallocated identity and to return an SLF Response with the address of the HSS node that is capable of handling the (set of) unallocated identities to which the received identity belongs. The SLF returns the address of the HSS handling the unallocated identity in a Dx SLF Response.

3. I-CSCF receives the SLF Response with the address of HSS. I-CSCF sends a Location Query with the received identity to the HSS over the Cx interface in order to obtain information about the identity.

Figure 5:
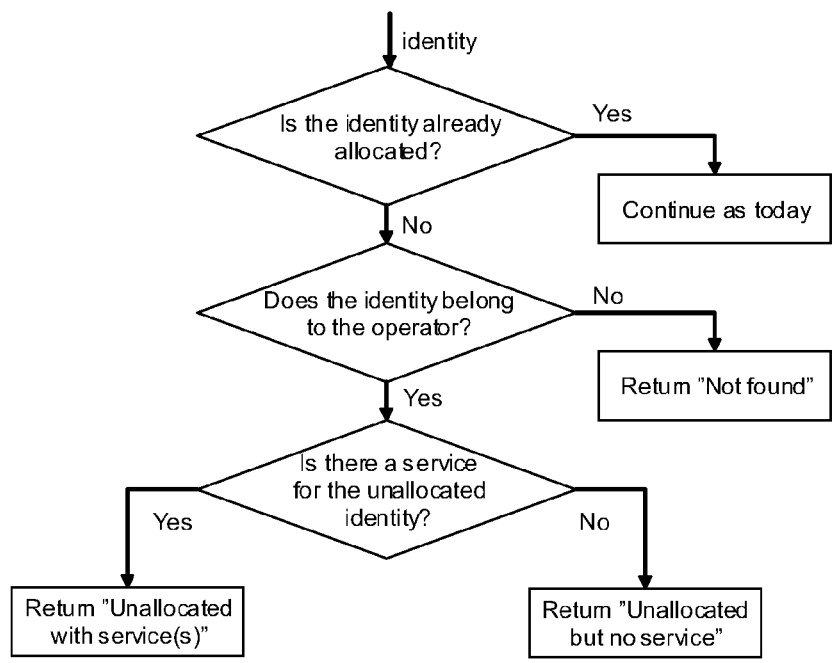
FIG. 5 is a flow diagram illustrating logic implemented at an HSS for the embodiments of FIGS. 3 and 4, the logic handling a Location Query received from an I-CSCF.

4. HSS receives the Location Query over the Cx interface with the identity. Today's HSS can determine that the identity is not allocated by the fact that it has no data provisioned for the identity. In the case being analysed here the identity belongs to the operator but is not allocated to any user or service. Therefore new data and handling is needed in the HSS. The HSS will be provisioned with new data that will enable it to determine that the identity is owned by the operator. If the HSS finds that the identity is not allocated but that it does belong to the operator it will determine it to be "unallocated". The HSS will further check if there are services for the (set of) unallocated identities to which the received unallocated identity belongs. If so, the HSS will return a Cx Location Response with an indication that the identity is unallocated. Otherwise, the HSS will return a "Not found" or "unallocated but no service" type of response. The HSS logic is depicted in FIG. 5 detailing what type of result is returned by the HSS in response to the query. The "unallocated identity" response may be implemented in a variety of ways, e.g. as an explicit indication or as a reference to an unallocated identities profile (other ways are also possible).

Figure 6:
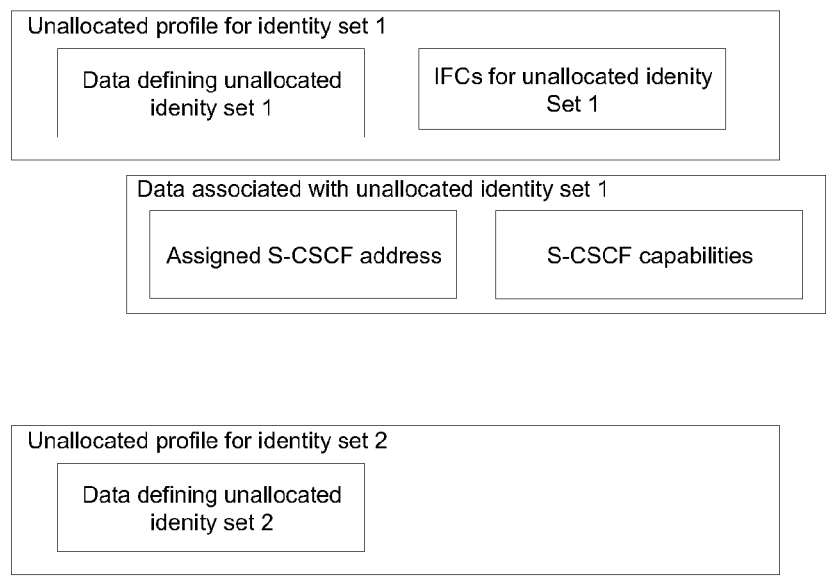
FIG. 6 illustrates data structures held by the HSS for the embodiments of FIGS. 3 and 4.

FIG. 6 illustrates how the new data could be modelled in the HSS. It shows two unallocated identities profiles: one for set 1 of unallocated identities and the other for set 2. Set 1 has a list of IFCs associated with it while set 2 does not (meaning that there is no service for the identities in set 2). The data defining the unallocated identity sets is not further detailed here as it could be implemented in many different ways, e.g. as a set of the actual identities, by means of wildcarding, regular expressions or number ranges (other ways are also possible). Note also that the Figure is just an example; the new data in the HSS may be modelled in many different ways. If the HSS has stored the address of the S-CSCF serving the (set of) unallocated identities it will also return this address, otherwise it will return relevant S-CSCF capabilities required to handle the (set of) unallocated identities to which the received identity belongs.

5. I-CSCF receives the Location Query Response over the Cx interface with the result of the query. If the response indicates that the identity is "not found" or is "unallocated but no service", the existing procedures are followed (that is the I-CSCF will typically reject the SIP request or will forward it to another operator in case the identity is ported out). If the response indicates that the identity is unallocated the I-CSCF will select an S-CSCF if an S-CSCF is not already assigned (based on the received capabilities) or will use the address of the assigned S-CSCF received from the HSS to forward the SIP request.

The I-CSCF will include an unallocated identity indication in the SIP request it forwards to the S-CSCF. This indication may be in the form of a reference to the unallocated identities profile received from the HSS. It may be implemented in SIP in many different ways, e.g. as a URI parameter in the Request-URI, in a SIP header or in a SIP message body. One possible realisation could be to use the P-Profile-Key P-header described in draft-camarillo-sipping-profile-key-01.txt if unallocated identities would have a common user profile in HSS.

6. S-CSCF receives the terminating SIP request addressed to an identity with an unallocated identity indication. Having received the unallocated identity indication the S-CSCF may check already at this point if it already has the relevant unallocated identities profile applicable for the received unallocated identity. If the relevant profile is not already cached, the S-CSCF will need to fetch it from the HSS. The S-CSCF may also decide to assign itself to serve the (set of) unallocated identities to which the received identity belongs by storing its own address in the HSS against the (set of) unallocated identities. For any of these reasons the S-CSCF may therefore need to interact at this point with the HSS over the Cx interface. In environments with multiple HSS nodes, the S-CSCF has to find out the address of the HSS handling the unallocated identity. If the S-CSCF has previously cached the HSS address for the (set of) unallocated identities to which the received identity belongs, it will send the Cx Put/Pull Request directly to the HSS address as described in step 8. Otherwise the S-CSCF needs to obtain the address of the HSS from the SLF by sending the SLF Query with the received identity over Dx interface as in step 7 below.

7. As in step 2, the SLF returns the address of the HSS handling the unallocated identity in a Dx SLF Response.
8. S-CSCF receives the SLF Response with the address of the HSS. S-CSCF sends a Cx Put/Pull Request to fetch the unallocated identities profile and/or store its address in the HSS. The request includes the received identity and as an optimisation option may also include the received unallocated identity indication, which is particularly useful in case the indication takes the form of a reference to the unallocated identity profile in the HSS.
9. HSS receives the Cx Put/Pull Request with the identity and optionally with the unallocated identity indication (potentially in the form of a reference to the unallocated identities profile). The HSS stores the address of the S-CSCF against the (set of) unallocated identities if one is provided in the request. The HSS will analyse the received identity and the unallocated indication and will return in the Cx Put/Pull Response the unallocated identities profile relevant for the (set of) unallocated identities to which the received identity belongs.
10. S-CSCF receives the Cx Put/Pull Response with the unallocated identities profile including one or more IFCs. S-CSCF caches the received profile. The S-CSCF may also store the HSS address and associate it with the (set of) unallocated identities. The S-CSCF then proceeds to the service invocation procedure which is performed as per today. The S-CSCF attempts to match the received initial SIP request against the IFCs in priority order and, if a match is found, forwards the SIP request (including the unallocated identity indication) to the AS address associated with the IFC. Note that the AS address may be an FQDN and may resolve (e.g. by means of DNS) to a number of AS instances, in which case the I-CSCF selects the AS instance.
11. AS receives a terminating SIP request addressed to an identity including the unallocated identity indication. If the AS needs to interact with the HSS to be able to execute its service logic, it may perform steps 12-14. Otherwise it executes the service logic for the unallocated identity. In this example sequence, the AS acts as a proxy or a B2BUA (back-to-back user agent) and sends the SIP request back to the S-CSCF as shown in step 16.
12. If more than one HSS node is used in the network, the AS needs to contact the SLF node to find the HSS node that handles the unallocated user identity. To do this, the AS sends an SLF Query with the received identity over the Dh interface. New handling is needed in the SLF. Upon receipt of the Dh SLF Query the SLF will now also have the ability to point to an HSS node for an unallocated identity, and will be able to return an SLF Response with the address of the HSS node that is capable of handling the (set of) unallocated identities to which the received identity belongs. The SLF returns the address of the HSS handling the unallocated identity in a Dh SLF Response.
13. The AS may want to interact with the HSS to read, store or subscribe to the data (held by the HSS) related to the (set of) unallocated identities to which the unallocated identity belongs, in which case it sends a request to the HSS over the Sh interface with the received identity. The request could be an Sh-Pull, Sh-Update or Sh-Sub-Notify request. The AS includes a new unallocated identity indication in the Sh Request.
14. HSS receives the Sh Request with the identity and the new unallocated identity indication and finds the reference to the data associated with the (set of) unallocated identities to which the received identity belongs. The HSS returns an Sh Response. The Sh Response may include the new unallocated identities profile for the (set of) unallocated identities.
15. After executing its service logic for the unallocated identity, the AS may forward the SIP request back to the S-CSCF addressed to the unallocated identity (since in this example sequence the AS is acting as a proxy or a B2BUA). The SIP request contains the unallocated identity indication.
16. S-CSCF receives the SIP request from the AS and continues its normal IFC evaluation process. In this example sequence another IFC is matched and the S-CSCF forwards the received SIP request to the AS associated with the matched IFC.

Second Embodiment of the Invention

Figure 7:
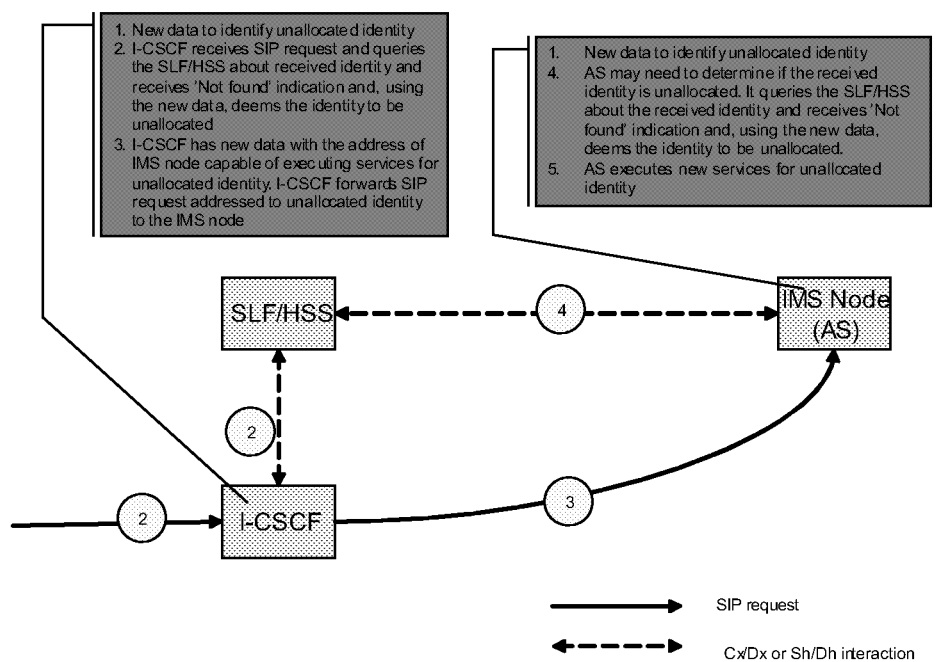
FIG. 7 illustrates schematically a second embodiment of a mechanism for handling unallocated addresses within the IMS and which performs AS invocation at an I-CSCF.

FIG. 7 illustrates schematically a second embodiment of the present invention which operates as follows:

1. Each IMS node that needs to determine if the identity is unallocated possesses new unallocated identity data. Each such node first queries the HSS to find out if the identity is already allocated in the HSS and, if not, checks the identity against its own data to determine if the identity is owned by the operator. In this solution the I-CSCF will have this new data and the AS may need it.
2. Upon receipt of a terminating SIP request, the I-CSCF will query the HSS or the SLF (in a multi-HSS environment) about the user registration status of the identity received in the Request-URI and will obtain an indication that the identity is 'Not found' as per today's procedures. The I-CSCF will then check the received identity against the new unallocated identity data that it possesses to determine if the identity is owned by the operator. If not, the existing procedures will be executed. If the identity is owned by the operator, the I-CSCF will deem the identity to be unallocated.
3. The I-CSCF is pre-configured with the address of an IMS node (typically an AS) with the service logic for unallocated identity preconfigured. Once the I-CSCF determines the received identity to be unallocated, it forwards the SIP request to this address. Note that the I-CSCF will also have the ability to reject the request to an unallocated identity if there is no entity with the service logic for unallocated identity preconfigured. Note that the AS address may be an FQDN and may resolve (e.g. by means of DNS) to a number of AS instances, in which case the I-CSCF selects the AS instance.
4. Upon receipt of the SIP request the AS may need to determine if the request is addressed to an unallocated identity (e.g. if the AS is hosting services for both allocated and unallocated identities). In order to do this, the AS first queries the HSS or the SLF (in a multi-HSS environment) about the identity and will obtain an indication that the identity is 'Not found' as per today's procedures. The AS will then check the received identity against the new unallocated identity data that it possesses to determine if the identity is owned by the operator. If not, the AS may reject the SIP request. If the identity is owned by the operator, the AS may deem the identity to be unallocated.

5. The AS will execute new service(s) for the unallocated identity.

Figure 8A:
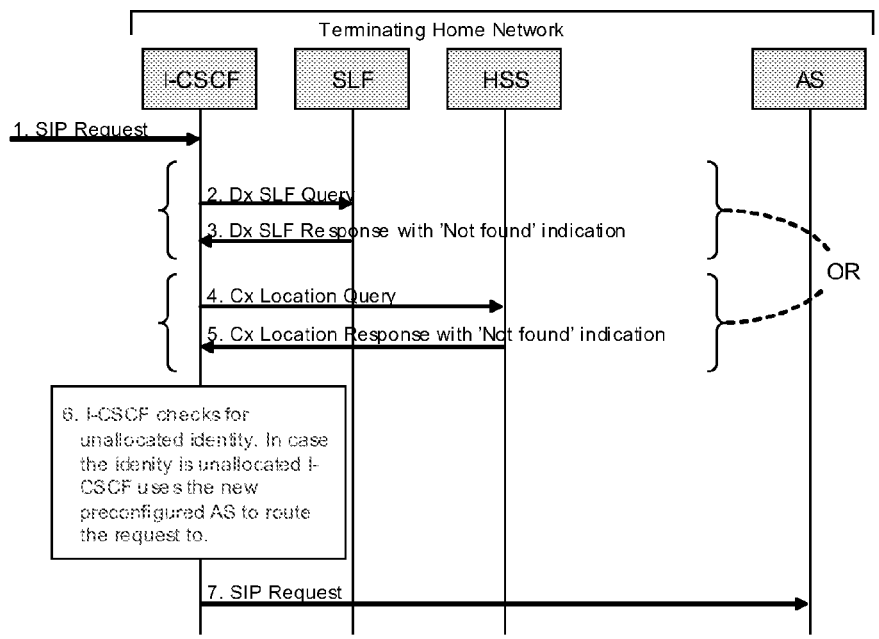
FIGS. 8a and 8b present a signalling flow for the embodiment of FIG. 7.
Figure 8B:
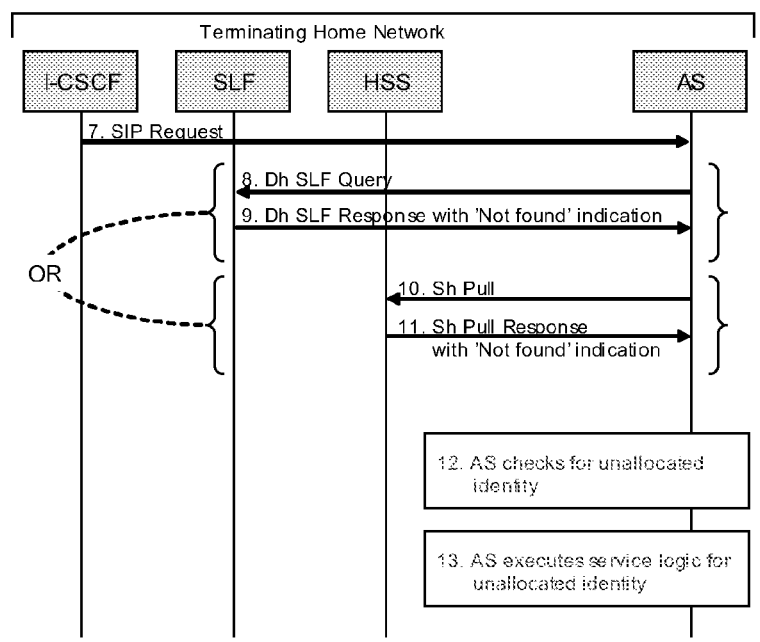

FIGS. 8a and 8b show an example information flow associated with this embodiment, where the numbered steps are as follows:

1. I-CSCF receives a terminating SIP request (which can be any request other than a SIP REGISTER request) addressed to an identity. In environments with multiple HSS nodes the I-CSCF must find out the address of the HSS handling the identity and sends a SLF Query with the received identity over the Dx interface to the SLF as in step 2 below. Otherwise the I-CSCF sends a Cx Location Query with the received identity directly to the HSS and the sequence continues at step 4.
2. SLF receives the SLF Query over the Dx interface with the identity. As in today's SLF, the SLF does not find an HSS for an unallocated identity and returns a 'Not found' indication in an SLF Response.
3. I-CSCF receives the SLF Response with a Not found' indication. The sequence continues in step 6.
4. HSS receives the Location Query over the Cx interface with the identity. As in today's HSS, where the identity is unallocated the HSS does not find a record of the identity and returns a 'Not found' indication in a Cx Location Response.
5. I-CSCF receives the Cx Location Response with a 'Not found' indication. The sequence continues at step 6.
6. Having received an indication that the received identity is Not found' in SLF/HSS, the I-CSCF will check if the received identity is owned by the operator based on the new unallocated identities data preconfigured in the I-CSCF. In the case being considered here, the received identity is owned by the operator and is therefore deemed by the I-CSCF to be unallocated. The I-CSCF will further use the new piece of data with the address of the AS capable of handling the unallocated identity, and will forward the SIP request to the AS. Where there is no AS to execute the service logic for the unallocated identity, the I-CSCF rejects the SIP request (this case is not shown in the sequence).
7. AS receives the SIP request addressed to an unallocated identity. If the AS services requests for both allocated and unallocated identities it may need to determine if the received identity is unallocated and may therefore need to interact with the SLF/HSS. Otherwise the AS will continue processing at step 13. In environments with multiple HSS nodes, the AS must find out the address of the HSS handling the identity and sends an SLF Query with the received identity over the Dh interface to the SLF as shown in step 8 below. In single HSS environments, the AS sends an Sh request (e.g. Sh-Pull) with the received identity directly to the HSS and the sequence continues at step 10.
8. SLF receives the SLF Query over the Dh interface with the identity. As in today's SLF, the SLF does not find an HSS for an unallocated identity and returns a 'Not found' indication in SLF Response.
9. AS receives the SLF Response with a 'Not found' indication. The sequence continues in step 12.
10. HSS receives the Sh request (e.g. Sh-Pull) with the identity. As in today's HSS, when the identity is unallocated the HSS does not find a record of the identity and returns a 'Not found' indication in a Sh Response.
11. AS receives the Sh Response with a 'Not found' indication. The sequence continues in step 12.
12. Having received an indication that the received identity is 'Not found' in the SLF/HSS, the I-CSCF will check if the received identity is owned by the operator based on the new unallocated identities data preconfigured in the AS. In the case being analysed here, the received identity is owned by the operator and is therefore deemed by the AS to be unallocated.
13. AS executes the new service logic for unallocated identity.

It will also be appreciated by the person of skill in the art that various modifications may be made to the above-described embodiments without departing from the scope of the present invention. For example, it is envisaged that different groups or classes of unallocated identities can be handled in different ways. This could be done by allocating different application servers to different ranges of identities, or by applying different service logic, within the same application server, to different ranges.

The invention claimed is:

1. A method of handling a SIP request received by an IP Multimedia Subsystem (IMS) network, the method comprising the steps of:
    determining that a SIP destination identity is within a range of identities owned by an operator of the IMS network but is currently unallocated to a subscriber or service of the IMS network; and,
    routing the SIP request to one or more SIP application servers within the IMS network and implementing service logic at the one or more application servers specific to the SIP destination identity.

2. The method according to claim 1, wherein said step of determining that the SIP destination identity is within a range of identities owned by an operator of the IMS network comprises:
    sending a query from an IMS node to a Home Subscriber Server or Subscriber Location Function; and,
    receiving, in response from the Home Subscriber Server or Subscriber Location Function, a determination that the SIP destination identity of the request is within a range of identities owned by the operator of the IMS network but is currently unallocated to a subscriber or service of the IMS network.

3. The method according to claim 2, wherein said IMS node is an I-CSCF.

4. The method according to claim 3, wherein the I-CSCF is preconfigured with an identity of an application server, and the method further comprises the steps of invoking that application server at the I-CSCF for the received SIP request.

5. The method according to claim 3, further comprising the steps of sending, from a Home Subscriber Server or Subscriber Location Function to the I-CSCF, an identity of an application server, and invoking that application server at the I-CSCF for the received SIP request.

6. The method according to claim 3, further comprising the steps of including in a response sent from the Home Subscriber Server or Subscriber Location Function to the I-CSCF, an S-CSCF identity, and forwarding the SIP request to the S-CSCF.

7. The method according to claim 3, further comprising the steps of allocating at the I-CSCF an S- CSCF based upon information provided to the I-CSCF by the Home Subscriber Server or Subscriber Location Function, and forwarding the SIP request to that S-CSCF.

8. The method according to claim 6, further comprising the step of including, in the SIP request sent from the I-CSCF to the S-CSCF, an indication of the determination result.

9. The method according to claim 6, further comprising the steps of:
sending a query from the S-CSCF to a Home Subscriber Server or Subscriber Location Function;
determining at the Home Subscriber Server or Subscriber Location Function that the SIP destination identity is within a range of identities owned by an operator of the IMS network but is currently unallocated to a subscriber or service of the network and,
returning a result of said determination step to the S-CSCF.

10. The method according to claim 2, wherein said IMS node is an S-CSCF.

11. The method according to claim 6, further comprising the step of invoking one or more application servers at the S-CSCF in response to the determination contained within the received request or made at or obtained by the S-CSCF.

12. The method according to claim 11, further comprising the step of preconfiguring the S-CSCF with Initial Filter Criteria for an unallocated SIP destination identity which is owned by the IMS network operator, the Initial Filter Criteria specifying at least one application server.

13. The method according to claim 11, further comprising the step of downloading Initial Filter Criteria for an unallocated SIP destination identity which is owned by the IMS network operator to the S-CSCF from a Home Subscriber Server upon receipt of a request at the S-CSCF, the Initial Filter Criteria specifying at least one application server.

14. The method according to claim 2, wherein said query is sent to a Home Subscriber Server, the method further comprising the steps of sending an initial query to a Subscriber Location Function, at the Subscriber Location Function identifying a Home Subscriber Server responsible for unallocated SIP destination identities, and returning that identity from the Subscriber Location Function to the Home Subscriber Server.

15. A node for use in an IP Multimedia Subsystem (IMS) network, comprising:
at least one processor; and,
at least one memory, said memory containing instructions executable by said processor whereby said node is operative to:
receive a SIP request containing a SIP destination identity; and,
determine whether or not the SIP destination identity of the SIP request is within a range of identities owned by an operator of the IMS network but is currently unallocated to a subscriber or service of the IMS network; and, if yes, route the SIP request to one or more SIP application servers within the IMS network or to another IMS network node.

16. The node according to claim 15, wherein said operation to determine whether or not the SIP destination identity of the SIP request is within a range of identities owned by the operator of the IMS network comprises sending the SIP request to a Home Subscriber Server or Subscriber Location Function and receiving, in response from the Home Subscriber Server or Subscriber Location Function, a determination as to whether or not the SIP destination identity of the SIP request is within a range of identities owned by an operator of the IMS network but is currently unallocated to a subscriber or service of the IMS network.

17. The node according to claim 15, wherein the node is an I-CSCF or an S-CSCF.

* * * * *